United States Patent [19]
Porter et al.

[11] 4,116,476
[45] Sep. 26, 1978

[54] QUICK DISCONNECT COUPLER ASSEMBLY

[76] Inventors: Gary K. Porter; George K. Porter, Jr., both c/o Porter Instrument Company, Inc., P.O. Box 326, Township Line Rd., Hatfield, Pa. 19440

[21] Appl. No.: 850,550

[22] Filed: Nov. 11, 1977

[51] Int. Cl.² ............................................. F16L 39/00
[52] U.S. Cl. ................................. 285/137 R; 285/317; 285/DIG. 15
[58] Field of Search .......... 285/137 R, 317, DIG. 15, 285/26, 29; 137/315

[56] References Cited
U.S. PATENT DOCUMENTS

| 2,626,974 | 1/1953 | Howard et al. | 285/317 X |
| 3,469,863 | 9/1969 | Riester et al. | 285/137 R |
| 3,538,940 | 11/1970 | Graham | 285/317 X |

FOREIGN PATENT DOCUMENTS

| 1,298,378 | 6/1969 | Fed. Rep. of Germany | 285/317 |
| 495,891 | 6/1954 | Italy | 285/137 R |

Primary Examiner—Dave W. Arola
Attorney, Agent, or Firm—Harding, Earley & Follmer

[57] ABSTRACT

A coupler assembly for supplying different fluids has a base member adapted to supply one fluid through a first socket member and a second different fluid through a second spaced socket member. A hose terminal fitting has a pair of spaced tubular plugs of different diameters for entry into said socket members. One of the socket members has a hook which is engaged by a latch on the hose terminal fitting for locking the tubular plugs against withdrawal from the sockets. Advantageously the latch is spring biased into the latching position and has a cam surface to provide for the camming of the latch over the hook as the tubular plugs are moved into the sockets. Preferably the hook lies in a plane substantially perpendicular to the axes of the plugs and the latch is mounted for sliding movement transversely of the hose terminal fitting.

1 Claim, 6 Drawing Figures

QUICK DISCONNECT COUPLER ASSEMBLY

BACKGROUND OF THE INVENTION

Coupler assemblies for stations supplying a gas for patient use are well known in the art. It is also known to provide means for securing the parts together to avoid an inadvertent separation and cutting off of the gas supply. Such prior art structures are found in G. L. Rogers U.S. Pat. No. 2,908,511 and B. C. Cranage U.S. Pat. Nos. 3,441,046 and 3,477,105 which are incorporated herein by reference. Each of these patents discloses a latching mechanism for preventing inadvertent separation of the coupler assembly with all of the latching parts being inside of a base member in the latching position. Each of these patents discloses a spring actuated latch holding mechanism located inside the base member and engaging a slot in a latch pin which is moved axially into the interior of the base. In each case the operation of the latch cannot be observed to insure satisfactory operation. Further, any malfunction of the latch is difficult to repair requiring disassembly of the base member. The latching mechanism of Rogers U.S. Pat. No. 2,908,511 is complex since it employs a plunger and other mechanism within the base to activate and inactivate the latch responsive to the position of a member inserted into the base. In both the Cranage patents cited above the actuation of a member protruding from the base is required in order to release the latch. By way of marked contrast the coupler assembly of the invention is all exterior of the base with the means for releasing the latch incorporated with the hose terminal fittings for ease of operation with one hand. While the latch of the invention is highly reliable, in the case of any malfunction it can be quickly replaced without disturbing the base. The coupler assembly of the invention is also advantageous in that it insures that the desired two gases will be supplied simultaneously since it secures together the hose terminal fittings. Further, it insures that each hose is connected to the desired gas by using different diameter plugs and sockets. It is simpler in construction and less expensive than the prior art structures.

BRIEF SUMMARY OF THE INVENTION

A coupler assembly for supplying different fluids has a base member adapted to supply one fluid through a first socket member and a second different fluid through a second spaced socket member. A hose terminal fitting has a pair of spaced tubular plugs of different diameters for entry into said socket members. One of the socket members has a hook which is engaged by a latch on the hose terminal fitting for locking the tubular plugs against withdrawal from the socket. Advantageously the latch is spring biased into the latching position and has a cam surface to provide for the camming of the latch over the hook as the tubular plugs are moved into the sockets. Preferably the hook lies in a plane substantially perpendicular to the axes of the plugs and the latch is mounted for sliding movement transversely of the hose terminal fitting. It is preferred to have the latch with a first portion which extends along a rear face of the fitting and is connected to a finger adjacent one end of the fitting and with the first portion also connected to a second portion of the latch adjacent the other end of the fitting which engages the hook with recesses in the first portion spanning the hose terminal fittings. The bridge may have flanges to guide the latch.

DETAILED DESCRIPTION

Figure 1:
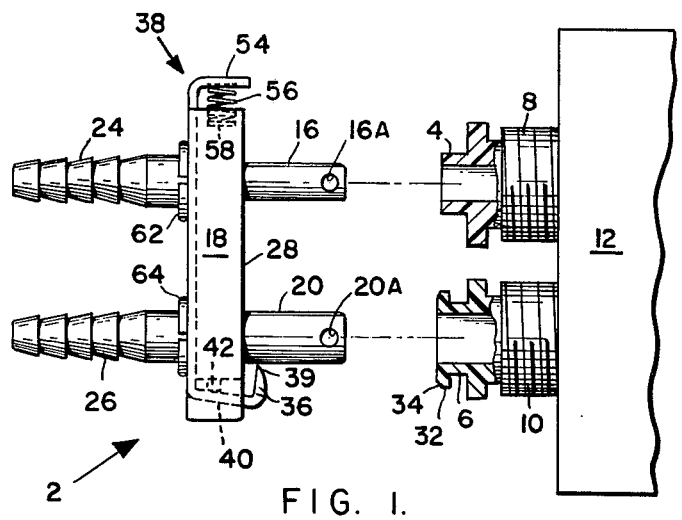
FIG. 1 is a plan view, partially broken away, of a disconnected coupler assembly in accordance with the invention.
Figure 2:
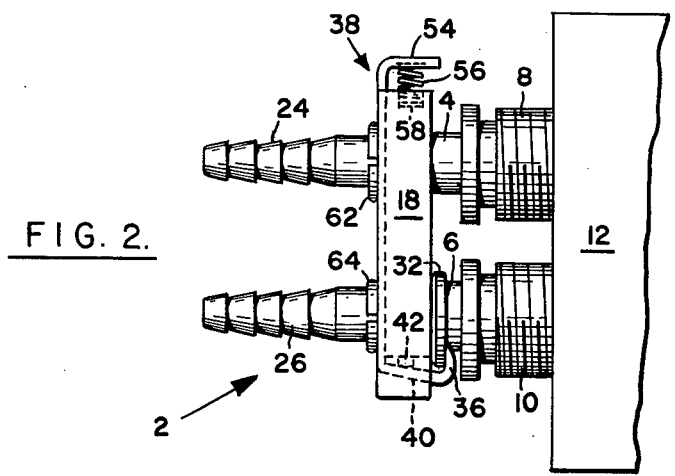
FIG. 2 is a plan view of the coupler assembly of FIG. 1 in the coupled position.
Figure 3:
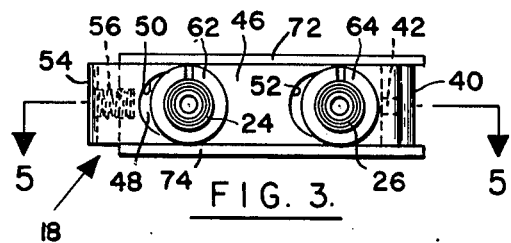
FIG. 3 is a rear view of the hose terminal fitting assembly of the device of FIG. 1.
Figure 4:
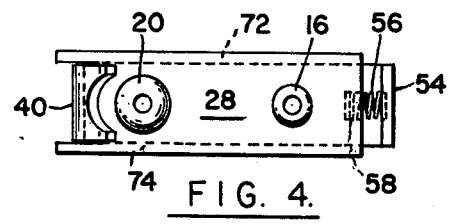
FIG. 4 is a front elevation of the assembly of FIG. 3.

A coupler assembly 2 has a pair of socket members 4 and 6 secured respectively by threads 8 and 10 to a base indicated at 12 of the type, for example, mounted in a wall. Socket member 4 has an inside diameter adapted to receive tubular plug 16 of hose terminal fitting 18. Socket member 6 has an inside diameter adapted to receive a larger diameter tubular plug 20 of hose terminal fitting 18. The differences between the diameters of plugs 16 and 20 and their respective socket members 4 and 6 prevent the delivery of the wrong gas through nipple 24 or nipple 26.

Plugs 16 and 20 have gas receiving openings 16A and 20A and can cooperate typically with a valve element such as valve element 41 and associated elements of G. L. Rogers U.S. Pat. No. 2,908,511 referred to above.

Plug 16 is in communication with a barbed nipple 24 which is adapted to be fitted into a hose, for example, a hose for supplying oxygen (not shown). Plug 20 is in communication with a barbed nipple 26 which is adapted to be received by a hose for supplying another gas, for example, nitrous oxide (not shown). A bridge 28 extends between and beyond the plugs and nipples.

Figure 5:
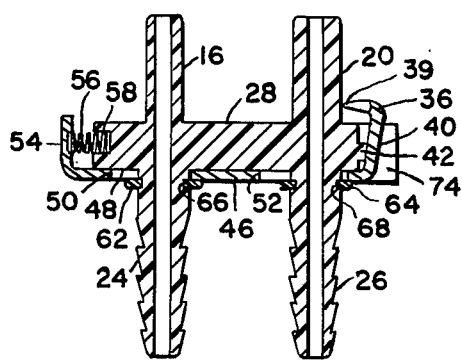
FIG. 5 is a section taken on the plane indicated by the line 5—5 in FIG. 3.
Figure 6:
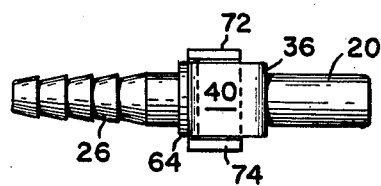
FIG. 6 is a left side elevational view of the assembly of FIG. 3.

Socket member 6 has a flange 32 with a beveled face 34 which forms a hook for engagement by the nose 36 of a latch 38. Nose 36 has an arcuate beveled portion 39 adapted to engage the beveled portion 34 of flange 32. Nose 36 is connected to latch portion 40 which is adapted to engage a stop pin 42 integral with bridge 28. Portion 40 in turn is connected to a latch portion 46 which lies flat against rear face 48 of bridge 28. Portion 46 has openings 50 and 52 spanning nipples 24 and 26 to permit the slide to move freely relative to said nipples. A latch operating finger 54 is connected to portion 46 and is biased to the left as viewed in FIG. 5 by a compression coil spring 56 received in a recess 58 in bridge 28. Split rings 62 and 64 mounted respectively in grooves 66 and 68 in nipples 24 and 26 retain latch 18 against the rear face 48 of bridge 28. Opposed flanges 72 and 74 on bridge 28 serve to guide latch 38.

With nipples 24 and 26 respectively connected to hoses (not shown) tubular plugs 16 and 20 are entered respectively into socket members 4 and 6 and moved inwardly causing the beveled portion 39 of nose portion 36 to engage beveled portion 34 of flange 32 which causes latch member 38 to move to the right as viewed from the rear thereof permitting nose portion 36 to pass beyond flange 32 and enter behind it to latch the hose terminal fitting against inadvertent removal. When it is desired to remove the hose terminal fitting, operating finger 54 is pushed inwardly against compression coil spring 56 to slide the latch 38 to the right as viewed from the rear of the latch releasing the nose 36 from engagement with the hook formed by flange 32 and permitting the withdrawal of the hose terminal fitting.

The above described embodiment is illustrative and is not intended to be limiting.

We claim:

1. The improvement in a coupler assembly for supplying different fluids having a base member adapted to supply fluid through a first socket member and a second different fluid through a second spaced socket member, each socket member being secured to the base and extending beyond the base, the improvement comprising:

a hose terminal fitting having a pair of spaced tubular plugs for entry into said socket members and each communicating with a hose nipple, a hook secured to one of said socket members exterior of the base member and extending substantially perpendicular to the axis of the socket members, a latch mounted on the hose terminal fitting substantially perpendicular to the axes of the nipples for engaging the hook and locking the tubular plugs against withdrawal from the sockets, said latch having a first portion which extends along a rear face of the fitting and is connected to an operating finger adjacent one end of the fitting and which is connected to a second portion of the latch adjacent the other end of the fitting which engages the hook, said second portion of the latch having a cam surface for camming the latch to the open position as the latch engages the hook on inward movement of the plugs to permit the latch to pass and then engage the hook, said first portion of the latch having recesses spanning the nipples to permit the latch to move relative to the nipples, a compression spring engaging the finger to bias the latch to the closed position, flanges on the fitting to guide the latch, and one of the plugs having a diameter larger than the diameter of the other plug and adapted to be received into the first socket member which has a diameter larger than the second socket member.

* * * * *